US006672402B2

(12) United States Patent
Ortt et al.

(10) Patent No.: US 6,672,402 B2
(45) Date of Patent: Jan. 6, 2004

(54) COMBINED FASTENERLESS MOTOR END CAP AND OUTPUT DEVICE MOUNTING

(75) Inventors: Earl M. Ortt, Bel Air, MD (US); Michael C. Doyle, Baldwin, MD (US); Robert J. Marcinkowski, Cockeysville, MD (US)

(73) Assignee: Black & Decker Inc., Newark, DE (US)

( * ) Notice: Subject to any disclaimer, the term of this patent is extended or adjusted under 35 U.S.C. 154(b) by 8 days.

(21) Appl. No.: 10/036,011

(22) Filed: Dec. 27, 2001

(65) Prior Publication Data

US 2003/0121676 A1 Jul. 3, 2003

(51) Int. Cl.[7] .......... B23B 45/02
(52) U.S. Cl. .......... 173/1; 173/216; 173/217; 310/47; 310/50
(58) Field of Search .......... 173/1, 216, 217, 173/29, 171, 93.5; 310/47, 50, 88, 83

(56) References Cited

U.S. PATENT DOCUMENTS

| | | | | | |
|---|---|---|---|---|---|
| 3,724,237 | A | | 4/1973 | Wood | |
| 4,093,096 | A | | 6/1978 | Augros | |
| 4,103,511 | A | | 8/1978 | Kress et al. | |
| 4,435,166 | A | | 3/1984 | Bondioli | |
| 4,482,073 | A | | 11/1984 | Gagliardi | |
| 4,597,453 | A | * | 7/1986 | Kilmer et al. | 173/171 |
| 4,625,134 | A | * | 11/1986 | Weaver | 310/83 |
| 5,033,552 | A | | 7/1991 | Hu | |
| 5,251,776 | A | | 10/1993 | Morgan, Jr. et al. | |
| 5,347,673 | A | | 9/1994 | Nickels, Jr. | |
| 5,409,256 | A | | 4/1995 | Gordon et al. | |
| 5,576,586 | A | * | 11/1996 | Blumenberg | 310/88 |
| 5,624,000 | A | * | 4/1997 | Miller | 173/217 |
| 5,637,104 | A | | 6/1997 | Ball et al. | |
| 5,722,574 | A | | 3/1998 | Pratt | |
| 6,039,126 | A | * | 3/2000 | Hsieh | 173/29 |
| 6,170,579 | B1 | * | 1/2001 | Wadge | 173/216 |

FOREIGN PATENT DOCUMENTS

| | | | |
|---|---|---|---|
| DE | 41 26 118 | A1 | 2/1993 |
| DE | 44 22 492 | A1 | 1/1995 |
| DE | 42 35 962 | C2 | 11/1997 |
| DE | 197 29 988 | C1 | 8/1998 |
| DE | 196 34 502 | C2 | 4/1999 |
| DE | 298 20 723 | U1 | 4/1999 |
| EP | 0 408 987 | B1 | 12/1994 |
| EP | 0 847 127 | A1 | 6/1998 |

* cited by examiner

*Primary Examiner*—Scott A. Smith
(74) *Attorney, Agent, or Firm*—Harness, Dickey & Pierce, P.L.C.

(57) ABSTRACT

A motor end cap and output device housing is provided that includes a motor end plate having an output device attachment area and a output device housing having a motor end plate attachment area. The output device attachment area includes a locking tab that mates with a slot portion in the output device housing to interlock the two together. As a result, the motor end plate can be conveniently attached to the output device housing without requiring extra fasteners.

15 Claims, 5 Drawing Sheets

COMBINED FASTENERLESS MOTOR END CAP AND OUTPUT DEVICE MOUNTING

FIELD OF THE INVENTION

The present invention relates generally to a motor end cap, and more particularly, to a motor end cap having a simplified output device mounting.

BACKGROUND OF THE INVENTION

Conventionally, power tools are designed having a motor that rotationally drives an output such as a drill bit, screwdriver, or other rotational device. With such a device, the output rotational speed and torque is obtained by providing a output device device, such as a planetary gear set, between the motor and the output. Here, the output device includes a circular housing that holds the planetary gear set. The motor, itself, is attached to one axial end of the output device housing with the motor output shaft pinion extending into the output device housing to drive the planetary gear set. The output of the planetary gear set then rotationally drives the output of the power tool. As a result, the motor and transmission form one unit.

Conventionally, during assembly, the one piece motor and output device are assembled before the exterior tool housing is applied. The one piece unit is positioned inside and assembled to the inner shell of the power tool. To maintain the motor and output device as one piece, a plurality of screws are typically fastened through ears on the end cap of the motor and apertures on the outer periphery of the output device housing. Also, the screws are sometimes fastened through apertures in the end of the motor instead of through ears. While this use of screws does maintain the motor and transmission as one unit, positioning plural screws and apertures through the output device and motor end require additional materials and labor, thereby increasing the overall cost of the system. Additionally, the screws and apertures are mounted outside the motor and output device and resultantly take up more radial space. As such, the overall one piece unit requires more radial space due to the addition of the screws and apertures. The present invention was developed in light of these and other drawbacks.

SUMMARY OF THE INVENTION

To overcome these and other drawbacks, the present invention provides a motor and output device assembly that includes a motor end plate with an output device attachment area and a output device housing with a motor end plate attachment area. The output device attachment area detachably connects to the output device housing to form a one unit output device assembly that can be easily detached in the future and does not require additional fasteners.

In another aspect, a power tool is provided that utilizes a motor end plate having an output device attachment area and a output device housing having a motor end plate attachment area. Again, the output device attachment area detachably connects to the motor end plate attachment area.

In another aspect, a method of attaching a motor end plate to a output device housing is provided. The method includes placing the motor end plate against an axial end of the output device housing such that locking tabs of the output device attachment area ride within slot portions on the output device housing. The motor end plate is then rotated to drive the locking tabs along the slot portions in the output device housing to detachably adjoin the motor end plate to the output device housing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely explanatory in nature and is in no way intended to limit the invention, its application, or uses.

Figure 1:
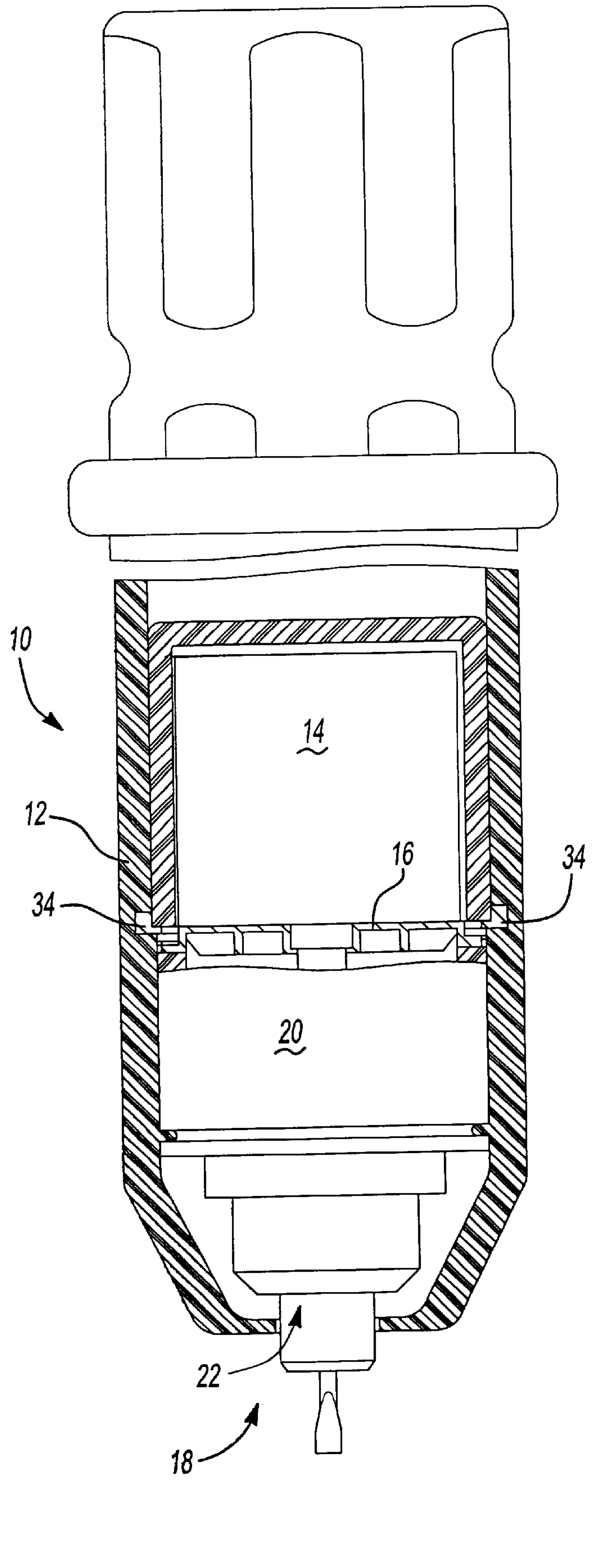
FIG. 1 is a cross-sectional view of a motor mounted to an output device according to the present invention.

Referring now to FIG. 1, a power tool 10 is shown having a casing 12, motor 14, motor end plate 16 and an output device 18.

The output device 18 generally includes a output device housing 20 that contains a planetary gear set to modify the input torque and rotational velocity from the motor to an output device, such as a screwdriver or other attachment head. Output shaft 30 (in FIG. 2) has a pinion 32 that acts as a sun gear for the planetary gear set of the output device 18. As a result, rotational energy transmitted from output shaft 30 is transmitted to planetary gears in the output device housing 20 and ultimately to the output device.

Motor 14 is positioned within casing 12. Motor end plate 16 acts to connect motor 14 to output device 18. (As will be discussed). Tabs 34 extend into casing 12 for anchoring to maintain motor 14 and output device 18 in a fixed rotational position in the casing 12. It is noted that the tabs 34 could also extend from casing 12 into the end cap 16.

Figure 2:
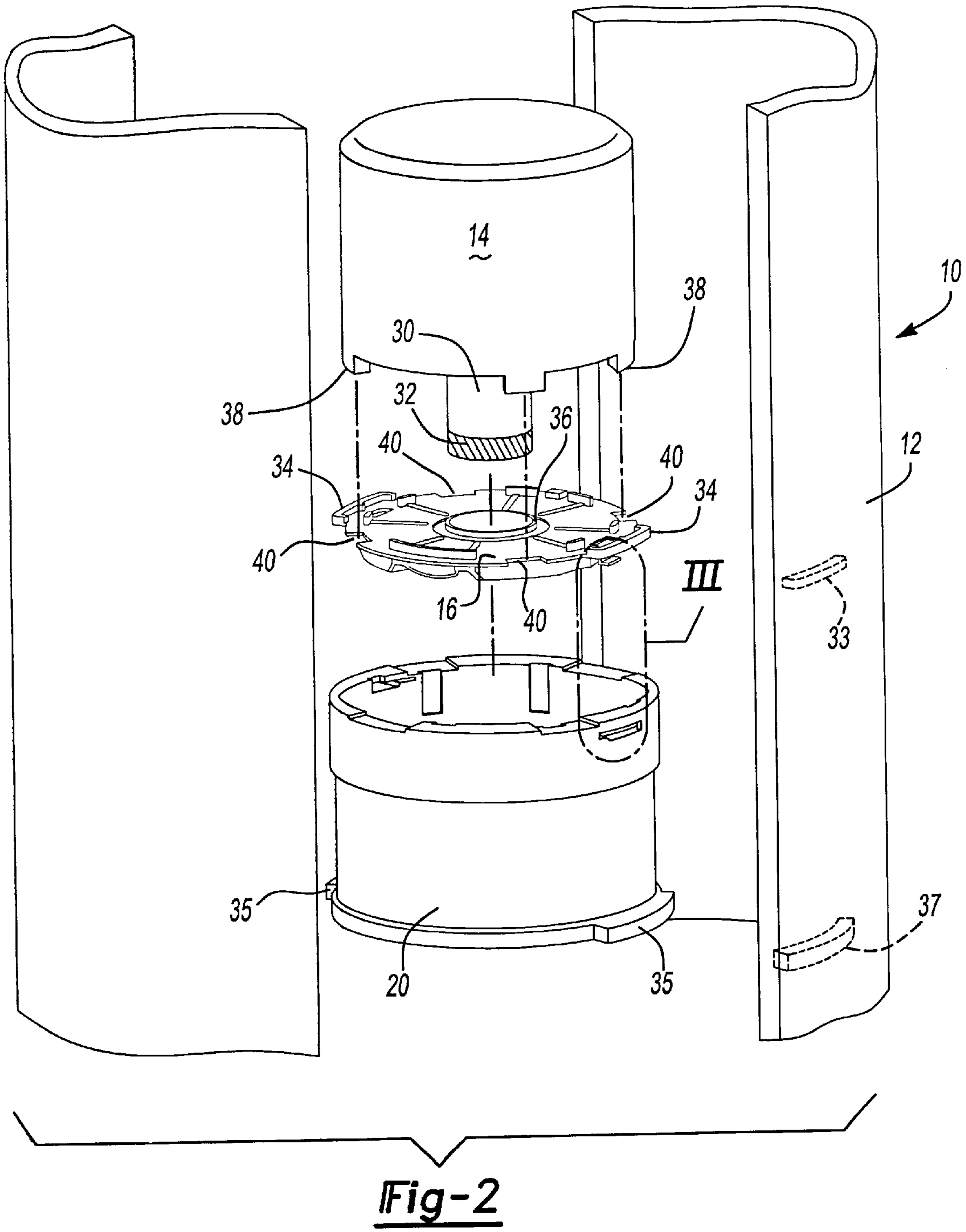
FIG. 2 is an exploded perspective view of a motor and output device according the present invention.
Figure 6:
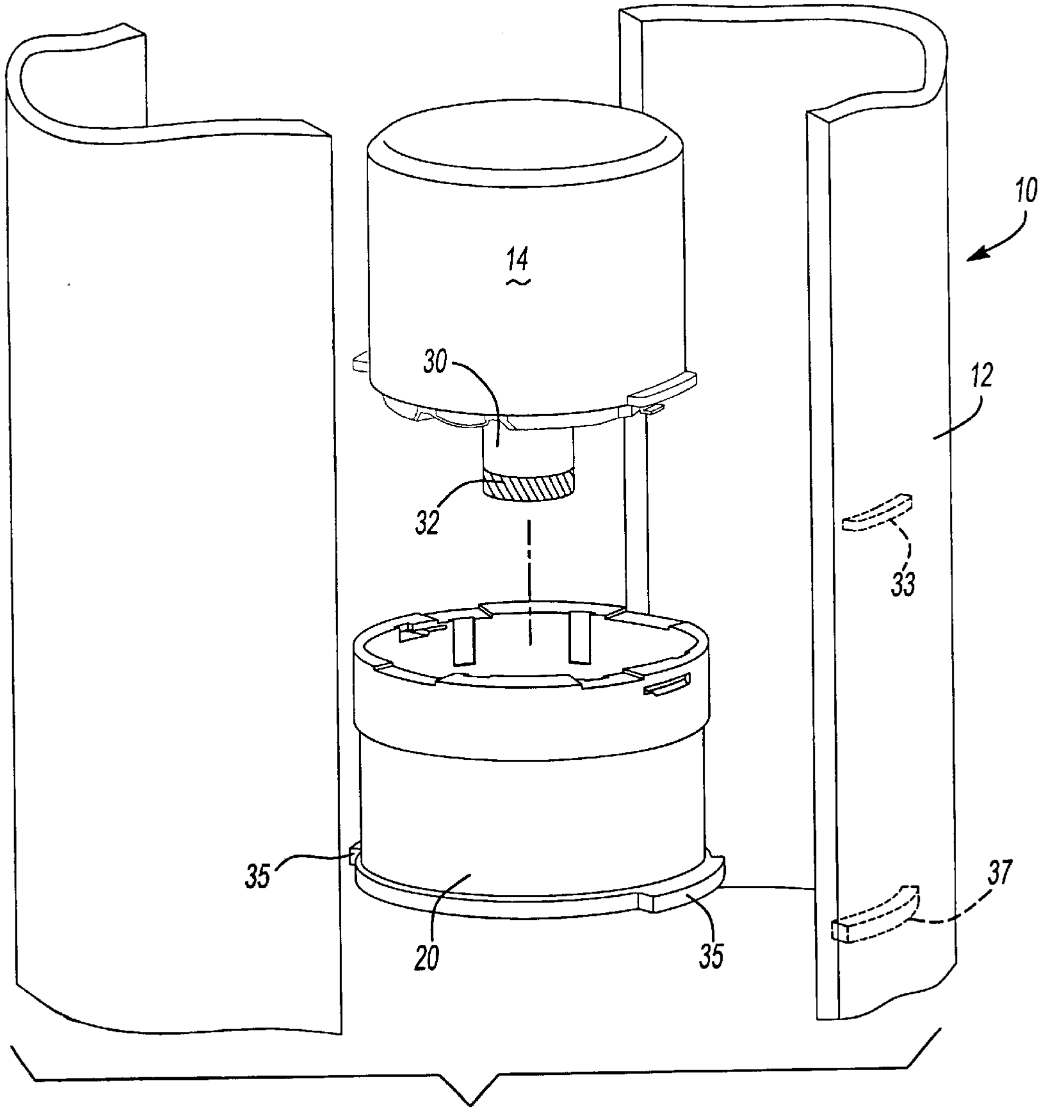
FIG. 6 is an exploded perspective view of a motor and output device according the present invention.

Referring now to FIG. 2, the assembly of power tool 10 is shown and described. To assemble motor end plate 16 to motor 14, motor housing tabs 38 (only two of four motor housing tabs 38 shown in FIG. 2) engage cutout sections 40 of motor end plate 16. Once engaged, motor tabs 38 are bent over to lockingly adjoin motor end plate 16 to motor 14. However, other known procedures to attach the motor end plate 16 to motor 14 can be used. Specifically, the motor end plate 16 can be formed, molded or extruded as one unit with the remainder of the motor in a can shape, and the motor and end plate can be one piece as shown in FIG. 6. However, the motor end plate still occupies the bottom portion of the motor.

Figure 3A:
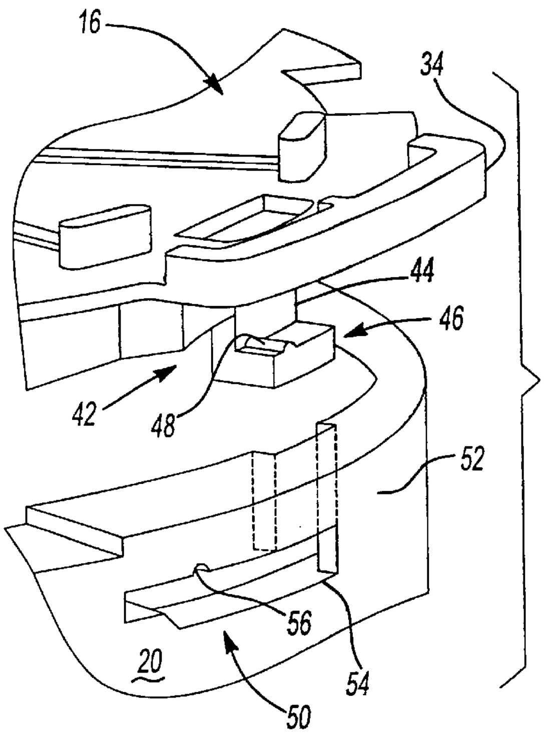
FIG. 3A is an exploded perspective view of the attachment between a motor and an output device housing according to a first embodiment of the present invention.
Figure 4A:
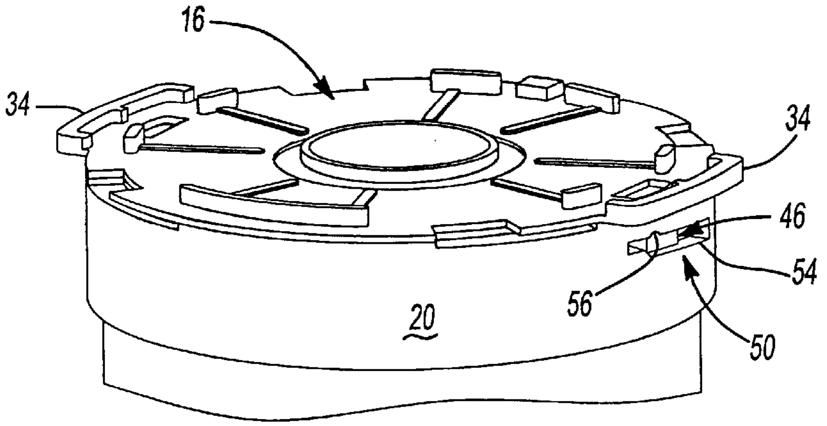
FIG. 4A is a perspective view of a motor end plate and output device housing assembled according to the first embodiment of the present invention.

Referring now to FIGS. 2, 3A and 4A, the attachment of motor end plate 16 to output device housing 20 is described in greater detail. In FIG. 3A, motor end plate 16 is shown having an output device attachment area 42. Output device attachment area 42 includes a base portion 44 disposed on a downward side of motor end plate 16, and a locking tab 46 extending radially outward from a center of motor end plate 16. On an upper side of locking tab 46 is locking bump 48. It is noted that output device attachment area 42 is positioned proximate tab 34. As such, as shown in FIG. 4A, another output device attachment area 42 can be positioned approximately 180 degrees opposite the one shown and described in FIG. 3A. It is noted, however, that only one tab may be used as shown in the figure. In addition, three or more tabs may also be used, and each of the tabs can be positioned at any radial location and need not be positioned 180 degrees apart.

To mate the motor end plate 16 with output device housing 20, output device housing 20 contains a motor end plate attachment area 50. Motor end plate attachment area 50 includes a downward slot portion 52 disposed in an axial direction on an axial face of output device housing 20. Circumferential slot portion 54 runs in a direction of the circumference of output device housing 20 and passes completely through the housing. Detent 56 is located at a predetermined position along circumferential slot portion 54.

Figure 5:
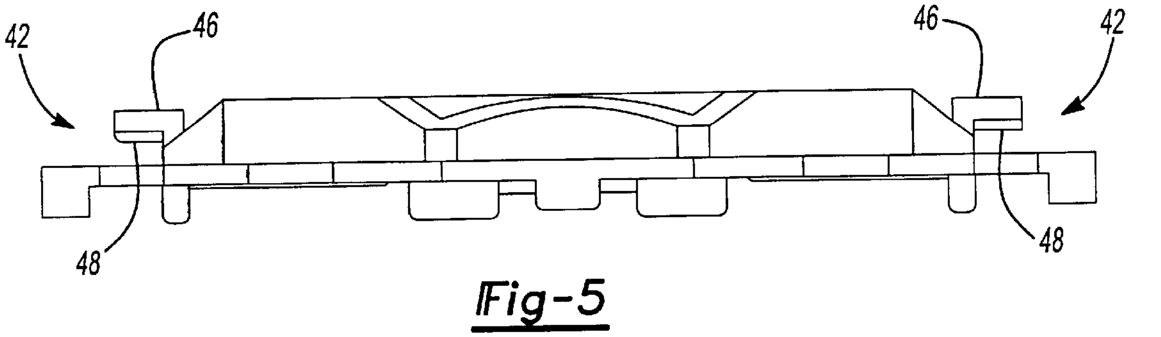
FIG. 5 is a side view of a motor end cap according to the first embodiment of the present invention.

Preferably, two Locking tabs 46 are positioned on opposite sides of motor end plate 16, about 180 degrees from one another. The locking tabs can be formed by any known process, and can also be formed by stamping the tabs out of the relatively flat motor end plate. In operation, locking tabs 46 are moved downward into downward slot portion 52 until the face of the end cap abuts with the face of the output device housing. Next, motor end plate 16 is rotated about its axis in a direction to move locking bump 48 toward detent 56. However, it is noted that output device housing 20 can be rotated with respect to motor end plate 16, instead of the motor end plate being rotated. The distance between the upper surface of locking tab 46 and the bottom surface of motor end plate 16 is slightly smaller than the distance between the top surface of output device housing 20 and the upper surface of circumferential slot portion 54. As a result, locking bump 48 is pressed against the upper surface of circumferential slot portion 54 causing resistance. When locking bump 48 is rotated and repositioned to fall into detent 56, that pressure is mostly relieved and locking bump 48 resists rotation from this position. Some pressure preferably remains to maintain the motor end plate and output device housing in a locked relationship. As shown in FIGS. 4A and 5, each output device attachment area 42 is shown with a respective locking tab 46 and locking bump 48. Output shaft 30, positioned through aperture 36 of motor end plate 16, enables pinion 32 to mesh with the planetary gear set inside output device housing 20.

Once assembled, as shown in FIG. 2, the motor 14 and output device housing 20 are positioned inside casing 12. As such, each of the tabs 34 and 35 sit inside respective apertures 33 and 37. This acts to axially and radially support the motor and output device with casing 12, thereby helping to alleviate the force applied to motor end plate attachment area and the output device attachment area. Again, only one tab and aperture need be used, and the two shown in the figure are preferred.

Figure 3B:
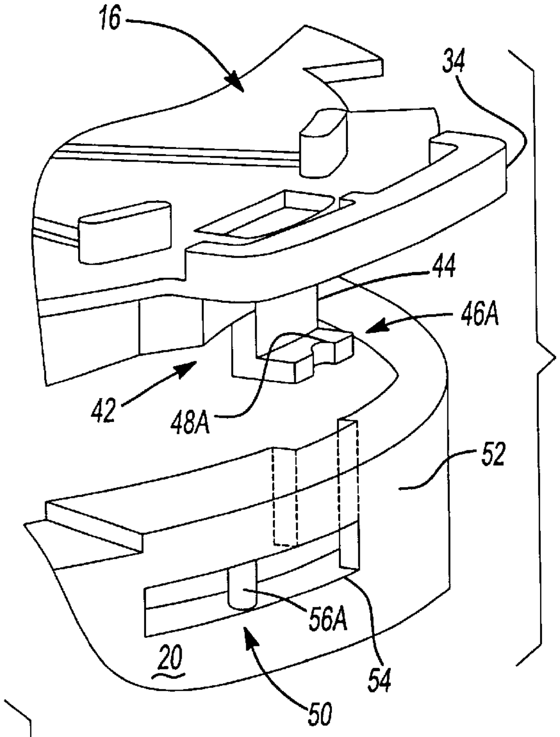
FIG. 3B is an exploded perspective view of the attachment between a motor and an output device housing according to a second embodiment of the present invention.
Figure 4B:
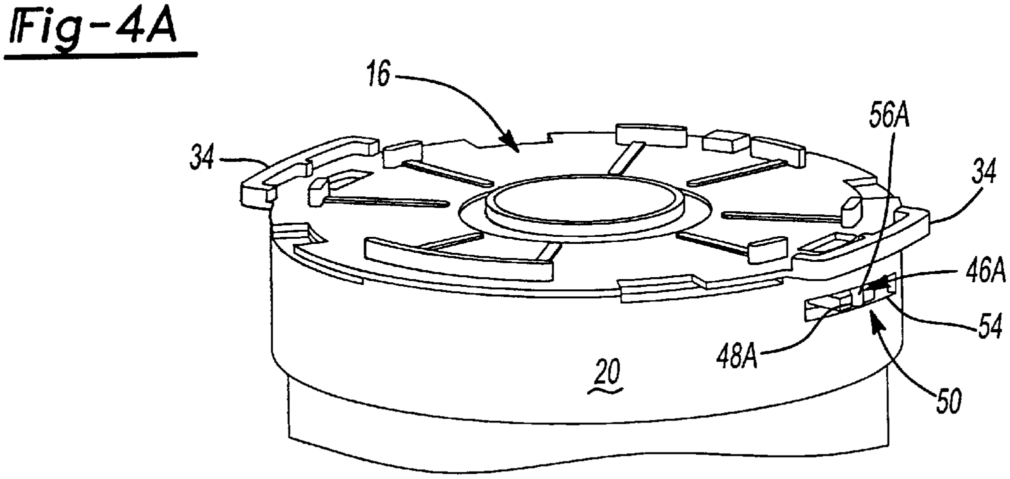
FIG. 4B is a motor end plate and output device housing assembled according to the second embodiment of the present invention.

Referring now to FIGS. 3B and 4B, the second embodiment of the present invention is shown as described. In FIG. 3B, output device attachment area 42 includes a locking tab **46*a* that has a locking bump 48*a* at the radial most outward position from the axial center of motor end plate 16. Likewise, output device housing 20 has a downward slot portion 52 with a width to accommodate the width of locking tab 46*a*. Circumferential slot portion 52 is provided with detent 56*a*. Detent 56*a* is a vertical rod extending from a bottom surface of circumferential slot portion 54 to a top surface of circumferential slot portion 54**.

In operation, motor end plate 16 is positioned on the upper face of output device housing 20 to allow locking tab **46*a* to drop down into downward slot portion 52. Next, motor end plate 16 is rotated in a direction to move locking bump 48*a* toward detent 56*a*. Interference exists between locking bumps 48*a* and detents 56*a*. This makes it difficult to rotate locking bumps 48*a* past detents 56*a*. As a result, a forced rotation of motor end plate 16 is required to move locking bumps 48*a* to a position past detents 56*a*. This ensures that motor end plate 16 remains in a locked position on output device housing 20. Reverse rotation in the opposite direction is required to release motor end plate 16. This rotation is also resisted by the interference between locking bumps 48*a* and detents 56*a***.

Figure 3C:
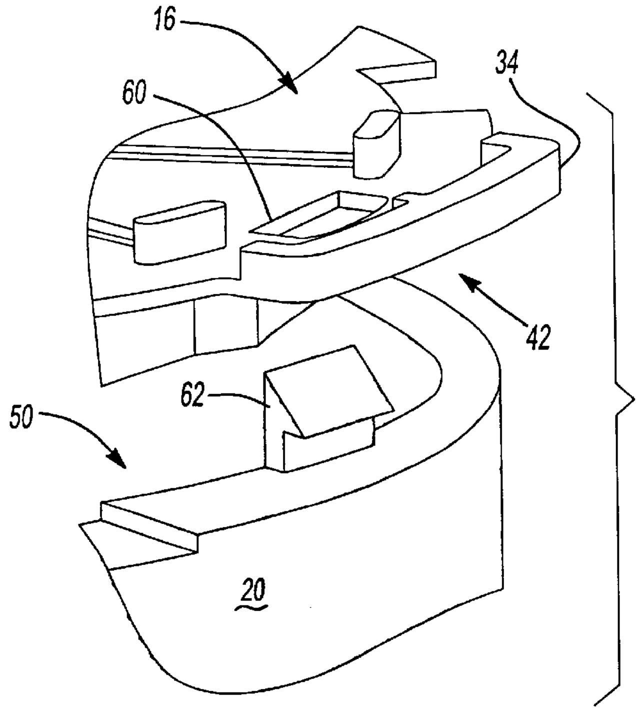
FIG. 3C is an exploded perspective view of the attachment between a motor and an output device housing according to a third embodiment of the present invention.
Figure 4C:
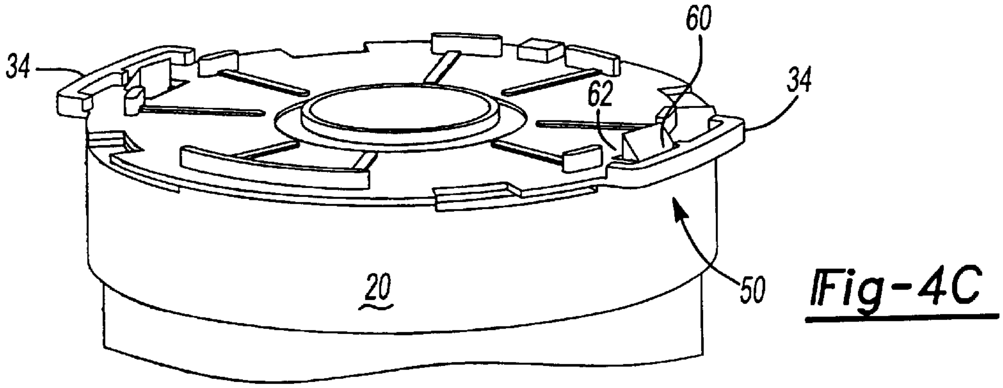
FIG. 4C is a motor end plate and output device housing assembled according to the third embodiment of the present invention.

Referring now to FIGS. 3C and 4C, a third embodiment of the present invention is shown. In FIG. 3C, motor end plate 16 has apertures 60 and is proximate tabs 34. Motor end plate attachment area 50 of output device housing 20 has barbed tabs 62. Barbed tabs 62 extend axially parallel to output device housing 20 and are attached to an inner surface of the output device. Accordingly, when motor end plate 16 is positioned downward onto an upper surface of output device housing 20, barbed tabs 62 interlocks with apertures 60 to maintain motor end plate 16 in a locked position with output device housing 20.

In the above three embodiments, it is noted that the widths of locking bumps 48 and **48*a* and downward slot portions 52 can be different on opposite sides of the housing. More specifically, one slot portion 52 and corresponding locking bump can be very wide while the opposite slot portion and locking bump can be narrow. Thus, each locking bump only fits its respective slot portion. With such an arrangement, motor end plate 16 can be attached to output device housing 20 in one direction and not the other. In other words, motor end plate 16 is unable to be rotated 180 degrees and then attached to output device housing 20. This has significant manufacturing advantages. Specifically, if the motor and output device are required to be aligned in one angular direction, such a design will prohibit misalignment or improper assembly. Likewise, in the embodiment of FIG. 3C and 4C, barb tabs 62 and apertures 60 can have different characteristics to ensure that motor end plate 16 is attached only one way to output device housing 20. In addition, it is noted that in the embodiments described for FIGS. 3A and 3B, motor end plate 16 can be detached from output device housing 20 very easily by simply rotating motor end plate 16 in a direction out of respective detents 56 and 56*a*. In the third embodiment, barb tab 62 on each 180 degree side is simply moved radially outward or likewise radially inward to allow walls of aperture 60 to slide thereover for removal of motor end plate 16. This has advantages for servicing the interior components of output device housing 20 and motor 14** after assembly.

Also, in the above three embodiments, it is noted that the motor end plate 16 attaches to the output device by using a quick connect/disconnect attachment mechanism. This allows the motor end plate 16 to detachably connect to the output device housing 20 by moving the motor endplate with respect to the output device. Specifically, in the embodiments of FIGS. 3A and 3B, the motor endplate is pushed down and rotated to lock the two elements together. And, the reverse procedure is used to unlock. Likewise, in the embodiment of FIG. 3C, the motor endplate is pressed down until the barbed tabs 62 lock with apertures 60. As a result, instead of using cumbersome and extra elements such as screws, bolts or other added devices, the present invention operates by use of the quick connect/disconnect attachment by mere movement of the two elements with respect to one another. Further, it is noted that other quick connect/disconnect arrangements can be used that are not included in this description.

The description of the invention is merely explanatory in nature and, thus, variations that do not depart from the gist of the invention are intended to be within the scope of the invention. Such variations are not to be regarded as a departure from the spirit and scope of the invention.

What is claimed is:

1. A motor and output device assembly comprising:

a motor end plate fixably attached to a motor and having an output device attachment area;

an output device having an output device housing, the output device housing having a motor end plate attachment area at one axial end of the output device housing;

an attachment mechanism on the motor end plate attachment area; and an attachment mechanism on the output device attachment area, the attachment mechanism of the output device attachment area mating with the attachment mechanism of the motor end plate attachment area;

wherein the motor end plate attachment mechanism and the output device attachment mechanism are rotatably connected to one another to form a quick connect/disconnect attachment.

2. The motor and output device assembly as claimed in claim 1, wherein the output device attachment area includes at least one locking tab extending radially outward from a center of the motor end plate.

3. The motor and output device assembly as claimed in claim 2, wherein:

the motor end plate attachment area includes at least one circumferential slot portion extending circumferentially around the output device housing; and wherein the locking tab is positioned within the circumferential slot portion to detachably connect the motor end plate to the output device housing.

4. The motor and output device assembly as claimed in claim 3, further comprising:

a locking bump positioned on a surface of the locking tab;

a detent positioned into a surface of the circumferential slot portion;

wherein the locking bump is positioned into the detent to prohibit the motor end plate from rotating with respect to the output device housing.

5. The motor and output device assembly as claimed in claim 3, further comprising:

an axially extending bar that extends in a direction parallel to an axis of the output device housing, the bar extending from a first surface of the circumferential slot portion to a second surface of the circumferential slot portion; and a locking detent on a radially outward portion of the locking tab, the locking detent being engaged to the axially extending bar to prohibit the motor end plate from rotating with respect to the output device housing.

6. The motor and output device assembly as claimed in claim 3, further comprising a downward slot portion extending from an axial surface of the output device housing proximate the motor end plate to the circumferential slot portion for providing a path for the locking tab during assembly.

7. The motor and output device assembly as claimed in claim 3, further comprising a pair of circumferential slot portions extending circumferentially around the output device housing;

a pair of locking tabs extending radially outward from a center of the motor end plate, each of the locking tabs positioned within a respective one of the circumferential slot portions to detachably connect the motor end plate to the output device housing.

8. The motor and output device assembly as claimed in claim 7, wherein each one of the locking tabs and respective slot portions is sized different for allowing the motor end plate to attach to the output device in only one direction.

9. The motor and output device assembly as claimed in claim 1, further wherein the motor end plate is formed integral with the motor.

10. A motor and output device assembly comprising:

a motor end plate having an output device attachment area;

an output device having an output device housing, the output device housing having a motor end plate attachment area at one axial end of the output device housing;

an attachment mechanism on the motor end plate attachment area; and an attachment mechanism on the output device attachment area, the attachment mechanism of the output device attachment area mating with the attachment mechanism of the motor end plate attachment area;

wherein the motor end plate attachment area is detachably connected to the output device housing to form a quick connect/disconnect attachment;

at least one aperture disposed at a radially outward periphery on the motor end plate; and a barbed tab disposed on an inner wall of the output device housing;

wherein the barbed tab interlocks with the aperture to detachably connect the motor end plate to the output device housing.

11. A power tool comprising:

a casing;

a motor and output device assembly disposed within the casing, the motor and output device assembly further including:

a motor having a motor end plate fixably attached to said motor, the motor end plate having an output device attachment area;

an output device having an output device housing, the output device housing including a motor end plate attachment area;

wherein the motor end plate attachment area is rotatably detachably connected to the output device attachment area by a quick connect/disconnect attachment.

12. The power tools claimed in claim 11, wherein the output device attachment area includes at least one locking tab extending radially outward from the motor end plate;

wherein the output device housing includes at least one circumferential slot portion positioned circumferentially around an outer surface of a output device housing;

wherein each locking tab is positioned within the circumferential slot portion to maintain the motor end plate engaged to the output device housing.

13. A power tool comprising:

a casing;

a motor and output device assembly disposed within the casing, the motor and output device assembly further including:

a motor having a motor end plate, the motor end plate having an output device attachment area;

an output device having an output device housing, the output device housing including a motor end plate attachment area;

wherein the motor end plate attachment area is detachably connected to the output device attachment area by a quick connect/disconnect attachment;

wherein the output device attachment area includes at least one aperture disposed radially outward from the motor end plate;

wherein the motor end plate attachment area includes at least one barbed tab;

wherein the barbed tab interlocks with the aperture to detachably connect the motor end plate to the output device housing.

14. A method for attaching a motor to an output device comprising the steps of:

providing a motor end plate at an axial end of a motor, the motor end plate fixably attached to said motor and having at least one locking tab extending radially outward from the motor end plate;

providing a output device housing having at least one circumferential slot portion circumferentially disposed on the output device housing, the output device housing having at least one downward slot portion connecting the circumferential slot portion to an axial end of the output device housing;

positioning the motor end plate against the axial end of the output device housing to insert the locking tab into the downward slot portion; and rotating the motor end plate with respect to the output device to move the locking tab along the circumferential slot portion in a direction away from the downward slot portion.

15. The method as claimed in claim 14, wherein:

the locking tab includes a locking bump;

the circumferential slot portion includes a detent; and the motor end plate is rotated until the locking bump sets into the detent.

* * * * *